US012222913B2

(12) United States Patent
Gunda et al.

(10) Patent No.: US 12,222,913 B2
(45) Date of Patent: Feb. 11, 2025

(54) EFFICIENT METHOD TO OPTIMIZE DISTRIBUTED SEGMENT PROCESSING MECHANISM IN DEDUPE SYSTEMS BY LEVERAGING THE LOCALITY PRINCIPLE

(71) Applicant: EMC IP Holding Company LLC, Hopkinton, MA (US)

(72) Inventors: Kalyan C. Gunda, Bangalore (IN); Jagannathdas Rath, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 18/525,344

(22) Filed: Nov. 30, 2023

(65) Prior Publication Data

US 2024/0111737 A1    Apr. 4, 2024

Related U.S. Application Data

(63) Continuation of application No. 17/191,403, filed on Mar. 3, 2021, now Pat. No. 12,032,536.

(51) Int. Cl.
*G06F 16/215* (2019.01)
*G06F 16/23* (2019.01)

(52) U.S. Cl.
CPC ........ *G06F 16/215* (2019.01); *G06F 16/2379* (2019.01)

(58) Field of Classification Search
CPC .............................. G06F 16/215; G06F 16/23
See application file for complete search history.

(56) References Cited

U.S. PATENT DOCUMENTS

| | | |
|---|---|---|
| 8,930,648 B1 | 1/2015 | Storer et al. |
| 10,606,807 B1 | 3/2020 | Simha et al. |
| 11,086,932 B1 | 8/2021 | Ramachandran et al. |
| 2003/0200282 A1 | 10/2003 | Arnold et al. |
| 2012/0150954 A1 | 6/2012 | Tofano |
| 2012/0158670 A1 | 6/2012 | Sharma et al. |
| 2013/0018946 A1 | 1/2013 | Brown et al. |
| 2014/0258370 A1 | 9/2014 | Bares et al. |
| 2015/0278101 A1* | 10/2015 | Zhou ................. G06F 12/0811 711/119 |
| 2016/0306560 A1 | 10/2016 | Maranna et al. |
| 2017/0091183 A1 | 3/2017 | Kenchammana-Hosekote et al. |
| 2017/0091232 A1 | 3/2017 | Ghanbari et al. |

(Continued)

*Primary Examiner* — Maher N Algibhah
(74) *Attorney, Agent, or Firm* — Workman Nydegger

(57) ABSTRACT

One example method includes receiving at a dedupe system, from a client, a request that comprises a set of fingerprints, where each fingerprint in the set corresponds to a particular data segment, filtering, at the dedupe system, the set of fingerprints into a set of unique fingerprints and a set of non-unique fingerprints, reading, at the dedupe system, from a container where copies of the non-unique fingerprints are stored, an additional set of non-unique fingerprints, sending, from the dedupe system to the client, a single response that comprises both the set of unique fingerprints and the additional set of non-unique fingerprints, and receiving from the client, at the dedupe system, data segments that respectively correspond to the unique fingerprints in the set of unique fingerprints, but no data segments corresponding to the non-unique fingerprints in the set of non-unique fingerprints are received by the dedupe system from the client.

20 Claims, 3 Drawing Sheets

(56) References Cited

U.S. PATENT DOCUMENTS

| | | |
|---|---|---|
| 2020/0004855 A1 | 1/2020 | Chepak et al. |
| 2020/0026781 A1 | 1/2020 | Khot et al. |
| 2020/0050686 A1 | 2/2020 | Kamalapuram et al. |
| 2020/0112521 A1 | 4/2020 | Desai |
| 2020/0117724 A1 | 4/2020 | Xin et al. |
| 2021/0157771 A1 | 5/2021 | Simha et al. |
| 2021/0255791 A1 | 8/2021 | Shimada et al. |

* cited by examiner

EFFICIENT METHOD TO OPTIMIZE DISTRIBUTED SEGMENT PROCESSING MECHANISM IN DEDUPE SYSTEMS BY LEVERAGING THE LOCALITY PRINCIPLE

FIELD OF THE INVENTION

Embodiments of the present invention generally relate to data management. More particularly, at least some embodiments of the invention relate to systems, hardware, software, computer-readable media, and methods for distributed data deduplication based on a locality principle.

BACKGROUND

Data deduplication processes may be used in data backup systems to reduce the amount of data that must be processed and stored. In general, a data deduplication may involve: segmenting the incoming data to variable sized chunks, and fingerprinting the chunks; sending the fingerprints to the dedupe system to find out if any of the fingerprints already exist; receiving the list of non-existing/unique fingerprints from the dedupe system; and, sending the segments corresponding to the returned unique fingerprints only, that is, the data that does not exist in the dedupe system. While such an approach may be somewhat effective, various problems nonetheless remain.

For example, while client libraries may reduce the network I/O (Input/Output operations) by sending lesser amount of unique data only, the dedupe system is still required to perform a significant amount of processing to identify the existing and non-existing fingerprints. This processing can include, for example, searching the references in possible in-memory locations such as fingerprint indexes, or on-disk fingerprint indexes/catalogues/databases. As well, the dedupe system must process each and every fingerprint sent to it by the client. This workload imposed on the dedupe system may be in addition to other tasks that CPUs (Central Processing Units) of a dedupe server may already be performing, such as garbage collection, processing requests from other clients, and or data movement to the cloud, for example. Thus, the workload on the dedupe system may be significant, and can impair the speed and effectiveness of dedupe system operations.

As another example of problems with dedupe processes and systems such as those noted above concerns RPCs (Remote Procedure Calls). In particular, all the fingerprints are typically sent by the client to the dedupe system using multiple RPC/network layer calls. Even if the client sends batches of fingerprints in a single call, there would still be a large number of network calls, and roundtrips between the client and the dedupe system and back to the client.

By way of illustration, a 100 GB file could be expected to have around 13 million fingerprints, assuming an 8 KB average segment size. Assuming that the client sends around 500 fingerprints in each RPC call, there would be around 26000 network calls for this one file. In a typical case, where hundreds or thousands of files are being processed, the number of RPCs required to be processed by the dedupe server may be quite significant, so much so that fast and effective operation of the dedupe system may be substantially impaired.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
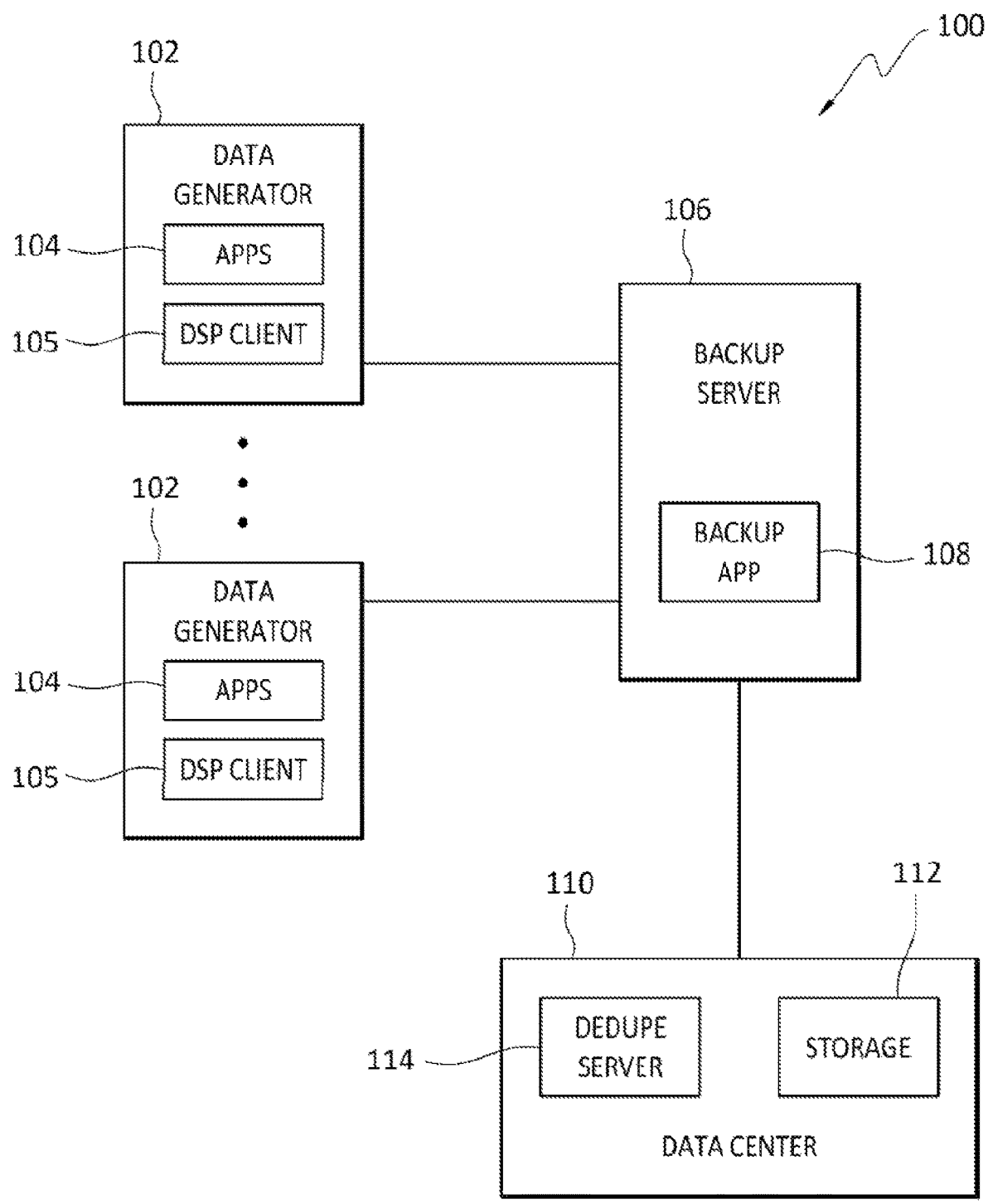
FIG. 1 discloses aspects of an example architecture and operating environment for some example embodiments.

Embodiments of the present invention generally relate to data management. More particularly, at least some embodiments of the invention relate to systems, hardware, software, computer-readable media, and methods for distributed data deduplication based on a locality principle.

In general, at least some example embodiments of the invention may take advantage of a principle of locality that may be implemented by dedupe systems. When data gets ingested to a data deduplication, or 'dedupe,' system, the dedupe system can ensure that the locality relationship of the incoming data segments is maintained throughout. In other words, related data are placed nearby and mostly in the same container objects as much as possible. For example, in the case of the DellEMC DataDomain (DD) system, this may be achieved by SISL (Stream Informed Segment Layout). Based on this SISL concept, DD and/or other systems may ensure that data from different files or jobs are written to their own set of containers. So, if a file is read, and a container object is selected, then the probability may be very high that a majority of the data in that container would belong to this file and will be read by the client in the near future.

Embodiments of the invention may leverage this functionality to provide an efficient method to optimize the amount of fingerprints exchanged over the network between the client and the destination dedupe system, while also reducing the amount of processing done by the dedupe system to a great extent. In general, a dedupe server may, in response to an RPC received from a client, send to the client not only the set of unique fingerprints implicated by the RPC, but also a set of non-unique fingerprints that have been identified by the dedupe server as possibly expected to match, based on the locality principle, fingerprints that may be sent by the client in a future RPC to the dedupe server. The client may then check to see if the non-unique fingerprints are already present at the client and, if so, the client may perform a dedupe process itself, that is, by not including the non-unique fingerprints in a subsequent RPC sent to the dedupe server. In this way, the number of fingerprints sent by the client to the dedupe server for processing may be reduced, the processing needed to be performed by the dedupe server may be reduced, and communication traffic between the dedupe server and the client may be reduced as well since fewer RPCs may be needed.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, at least some example embodiments of the invention may reduce the number of RPC calls issued by a client to a dedupe server. An embodiment of the invention may transfer part of a dedupe workload associated with a client from a dedupe server to the client. An embodiment of the invention may reduce the amount of network communications and traffic between a client and a dedupe server. An embodiment of the invention may reduce a workload imposed by a client on a dedupe server.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations which may include, but are not limited to, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing data backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may include any number 'n' of data generators 102, each of which may include one or more applications 104 which may create new and/or modified data as part of their normal operations. The applications 104 may be of any type and may include, by way of example and not limitation, engineering applications, virtual machines, word processing applications, spreadsheet applications, database applications, and email applications. In order to protect data generated by the applications 104, a backup server 106 may be provided that includes a backup application 108 that is operable to create backups of data created by the data generators 102 and transmit the backups to a storage site 110, such as a datacenter for example. The storage site 110, which may or may not comprise a cloud storage site, may store the backups in storage 112. The storage site 110 may also include one or more dedupe servers 114 which may receive backups from the data generators 102 and may generally operate to deduplicate the backup data prior to storage of the backups in the storage 112.

In some example embodiments, and as discussed in more detail below, the dedupe server 114 may co-ordinate with a DSP client 105, for example, of the data generators 102 to perform deduplication. More particularly, both the dedupe server 114 and the data generators 102 may perform data deduplication operations, where some of the deduplication effort that could be performed by the dedupe server 114 is performed, instead, inside the data generators 102. Note that in some instances, the backup server 106 may be referred to herein as constituting, or comprising, a 'client,' although entities other than a backup server like data generators 102, may also operate as a client as contemplated by this disclosure. Thus, a 'client' should not be construed to be limited to a backup server.

B. Overview

In general, some example embodiments of the invention embrace, among other things, efficient methods to optimize a DSP (Distributed Segment Processing) mechanism for entities such as, but not limited to, client libraries such as the DataDomain DDBoost platform.

By way of background, a data deduplication system, or 'dedupe system,' may operate to split a file into unique & variably sized chunks of data, also known as segments and these segments may be deduped across multiple files in the system or dedupe domain. The uniqueness of each segment may be identified by segment references, or 'seg refs,' or fingerprints. A fingerprint may be a hash of a data segment, which uniquely identifies the corresponding data from which the hash was generated.

Ingestion of data to a data storage site may involve backup applications and clients sending the whole data to the dedupe system/server using networks and protocols such as, for example, NFS (Network File System) or CIFS (Common Internet File System), or similar networks and protocols. The dedupe server may then process the data by segmenting the data, fingerprinting the segments, identifying the unique, and non-unique segments, and then writing only the new and unique segments to storage. For example, rather than storing multiple copies of the same data segment, only a single copy may be stored, and one or more pointers stored that point to the single copy.

To reduce the amount of data being sent by clients to the dedupe system, some dedupe systems may implement DSP in the form of Client libraries which run on the backup clients, or on other client systems from where data is ingested into the dedupe system via the client library. In DSP, after the client receives the new ingest data from the backup apps, the data may be segmented into segments and fingerprints are generated for each of the segments in the client itself. The client may then transmit the fingerprints to the dedupe server for processing. The dedupe server may then compare the fingerprints received from the client against a fingerprint filter, in order to identify the unique fingerprints that are not present in the fingerprint database, and thus correspond to data segments that have not been previously backed up by the dedupe server.

The dedupe server may then communicate back to the client which of the fingerprints received by the dedupe server from the client are unique, or new. The client may then backup the data by sending, to the dedupe server, only those segments corresponding to the unique fingerprints that are not present in the fingerprint database. Once the respective segments that correspond to the unique fingerprints are added to the backups maintained by the backup server, the new fingerprints may then be added to the fingerprint database, which may be maintained by the dedupe server. This approach may help in reducing the network 10 to a significant extent as compared to performing data ingestion using protocols such as NFS/CIFS.

C. Further Aspects of Some Example Embodiments

At least some example embodiments may take advantage of the principle of locality that may be implemented by dedupe systems. In general, when data is ingested to a dedupe system, the dedupe system may ensure that the locality relationship of the incoming data segments is maintained throughout. In other words, related data, such as data segments from the same file for example may, to the extent possible, be placed nearby and mostly in the same container objects, at the storage site. For example, in the case of DD, this data segment placement may be achieved by SISL (Stream Informed Segment Layout). In general, a platform, such as DD for example, may use SISL to help ensure that data from different files or jobs are written to their own respective container or set of containers. So for example, if a file is read, and a container object is selected, then the probability is very high that majority of the data in that selected container would belong to this file and will be read soon in the future.

Example embodiments of the invention may leverage this property, which may be referred to herein as a 'locality' property, to provide an efficient method to optimize the amount of fingerprints exchanged over the network between the client and the destination dedupe system, while also reducing the amount of processing done by the dedupe system to a possibly significant extent. The overarching premise of some example optimizations, such as that just noted, is that if, for example, a file backup1 dedupes to backup2, then may be most likely that more data from backup1 will dedupe to backup2. This may be mostly true where a full backup1 is taken at time t0, and a subsequent full backup2 is taken at t1. Except for the data which changed between t0 and t1, backup1 may dedupe to backup2. That is, except for the changed data, backup2 may have the same data as backup1. On average, the amount of data changed between successive backups may be about 5-10% of the total amount of data in either of the two backups, which may thus indicate that about 90-95% of the data is common to the two backups backup1 and backup2 and, as such, may be deduplicated.

In general, at least some embodiments of the invention embrace methods, such as the example discussed below. Initially, a backup server or other client may transmit, to a dedupe server, a set of fingerprints for filtering. This transmission, or call, may take the form of an RPC. In response to the client, the dedupe system may send back to the client, a set of unique fingerprints that are not in the fingerprint database maintained by the dedupe server. As part of the same response to the client, or separately, the dedupe system may also send a set of existing fingerprints, corresponding to respective container objects, that were matched with the fingerprints received by the dedupe server in the call from the client.

Next, the client, which may be performing a DSP process, may send another set of fingerprints to the dedupe system, along with a hint or suggestion to the dedupe server as to how many additional existing fingerprints should be sent back by the dedupe server to the client. The hint may be formulated on various bases. For example, the client may specify that 90 percent of the existing fingerprints should dedupe in order for the dedupe server to return additional fingerprints to the client for future matching.

If the dedupe system finds a fingerprint to be existing in any container object, then the dedupe system may also select a certain number of existing fingerprints from the same matching container object, or select additional fingerprints using one of the other methods disclosed herein. Based on the principle of locality, the probability of these fingerprints being sent by the client in next few future calls is very high. That is, because the additional fingerprints returned by the dedupe server are from the same container object as fingerprints previously returned by the dedupe server to the client, there may be a significant likelihood that those additional fingerprints will be sent in the future by the client to the dedupe server.

Thus, the dedupe system may send a set of unique, or non-existing fingerprints, and another set with existing fingerprints from matching container objects expected to match with future writes from the client to the dedupe server. The set of existing fingerprints may be simply piggy backed in the response of the same RPC call. That is, the set of unique fingerprints and the set of non-unique, or existing, fingerprints may be sent together with each other as a single response by the dedupe server. As such, the client need not issue an RPC for the existing fingerprints, since those have already been sent, or will be, by the dedupe server as part of the piggy back response to an RPC and hint from the client.

As illustrated by the foregoing example, it can be seen that the client may thus receive: a set of unique fingerprints, the respective corresponding data segments of which may be sent by the client back to the dedupe server to be written in the dedupe system; and, an additional set of existing fingerprints, some or all of which may be received by the client in response to a hint or suggestion transmitted earlier by the client, and which the client may use in the future to dedupe segments itself on the client by matching segment fingerprints with the existing fingerprints. That is, once the next set of data is received from the backup application, and segmented and fingerprinted by the client, the client may first check each of those fingerprints with the in-memory fingerprint list. If a fingerprint is found in that fingerprint list, then that fingerprint may not be sent to the dedupe system. Thus, this approach may significantly reduce the number of RPC round trips required between the client and the dedupe server, and may also reduce the workload of the dedupe system, since the dedupe system may now have a relatively smaller number of fingerprints to filter. Finally, in some embodiments, the segment tree or metadata mapping, such as offset, length info, and/or other metadata, may be sent by the client to the dedupe system to enable the dedupe system to construct the metadata for the file data that is being ingested.

D. Aspects of Some Example Methods

Figure 2:
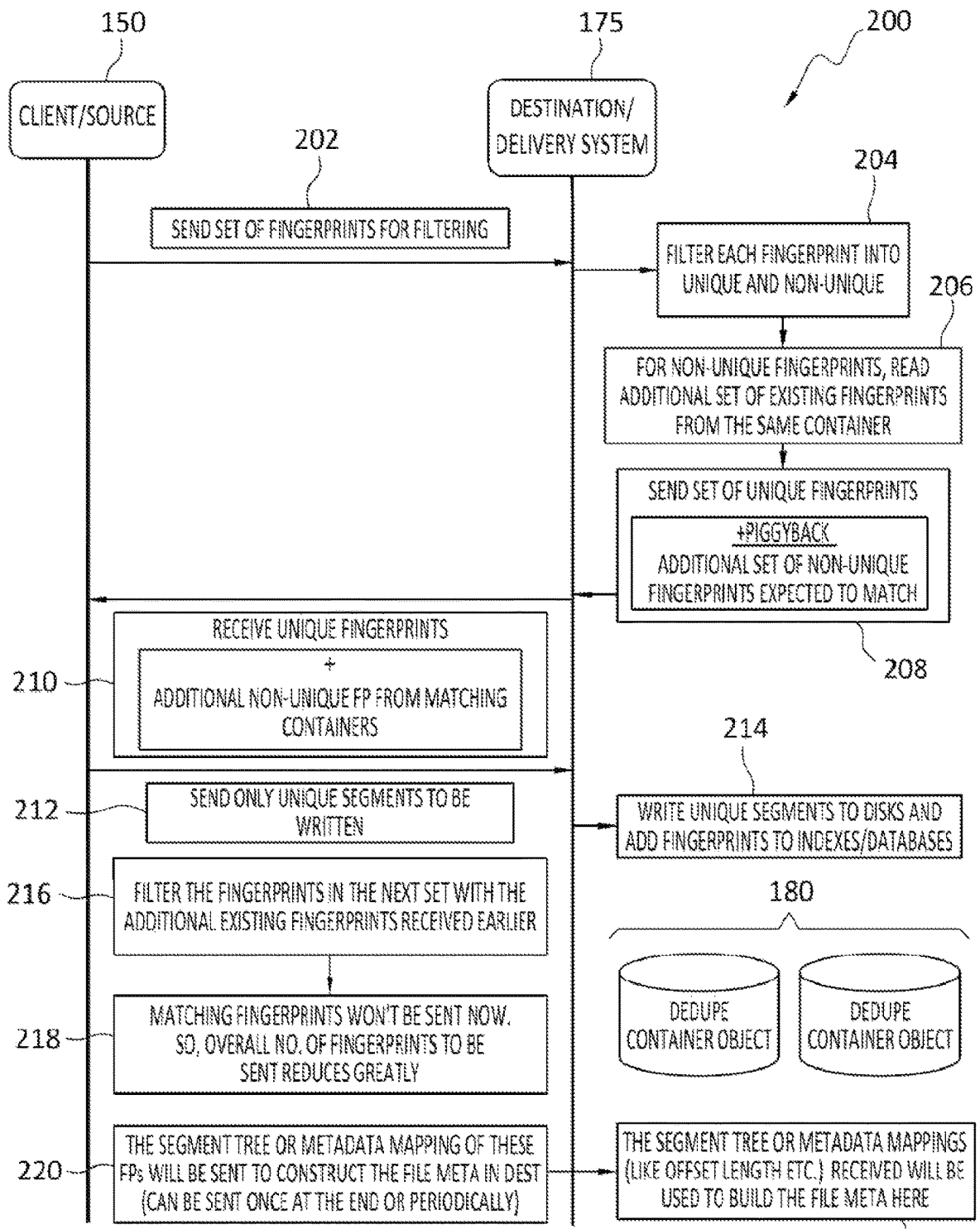
FIG. 2 discloses aspects of an example architecture and method according to some example embodiments.

With continued attention to FIG. 1, and directing attention now to FIG. 2, an example method 200 is disclosed for optimized distributed segment processing. In the example of FIG. 2, the various operations may be performed, generally, by a data source 150 and a data destination 175. In at least some example embodiments, the data source 150 may take the form of a backup server, and the data destination 175 may take the form of a dedupe system that includes a dedupe server. The data destination 175 may include storage that holds one or more dedupe container objects 180.

It is noted with respect to the example method of FIG. 2 that any of the disclosed processes, operations, methods, and/or any portion of any of these, may be performed in response to, as a result of, and/or, based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, in some embodiments, the various processes of the method 200 may be performed in the order shown in FIG. 2, while in other embodiments, those processes may be performed in an order different from what is shown in FIG. 2.

Initially, a client may receive data, such as a backup data set for example, from a backup application. The backup application may, or may not, be hosted by the client or by a backup server. No particular form, type, or amount, of data is required. After receiving the data, the client may send 202 the fingerprints in batches to the dedupe system to check if any of them already exist. The number of fingerprints sent in any given instance or batch may be determined by the client in some embodiments, or by the dedupe system in other embodiments. The fingerprints may be sent 202 using RPC/network layer calls, although no particular type or form of communication is required for sending 202 the fingerprints.

At the same time, or subsequent to, sending 202 of the fingerprints, the client may also send to the dedupe system a value for the variable referred to herein as "future ref threshold." The particular value, which may be set by the client, of this variable may indicate to the dedupe system how many additional existing fingerprints the dedupe system should send back, to the client, from matching container objects. The value of this variable may configurable, such as with a default value for example, which may then be adjusted in the client library based on visible, optimal, results.

The dedupe system may receive the batch of fingerprints, and a future ref threshold value, from the client. The dedupe system may then process the received fingerprints. Such processing may include filtering 204 each of the fingerprints and checking to determine if the fingerprints are present in a fingerprint library that may be maintained by/at the dedupe system. More particularly, in some embodiments, the dedupe server may perform a filtering process 204 by searching for each fingerprint in one or more in-memory fingerprint indexes and one or more on-disk fingerprint indexes to determine if the fingerprint already exists or if, instead, the fingerprint corresponds to a new unique data segment. In the latter case, the fingerprint may not appear in any of the indices and thus may not be found during the filtering 204 process.

As part of the filtering process 204, or separately, the dedupe system may check to see if a segment dedupes or not and, if not, the fingerprint of that segment may be added to a list, and group, of unique fingerprints, where the list and group may reside at the dedupe system. In some embodiments, while filtering 204 the fingerprints sent by the client, the dedupe server may will first check for each of those fingerprints among the set of non-unique fingerprints previously gathered by the dedupe system, and this check may be performed prior to any check of the fingerprint indexes. If the dedupe system finds a fingerprint in the set of non-unique fingerprints, there may be no need to examine the indexes for that fingerprint since it is known that the segment to which that fingerprint corresponds already exists.

With continued reference to the example of FIG. 2, the dedupe server may, with respect to any non-unique fingerprints received from the client, read 206 one or more additional sets of fingerprints from the same container that includes the non-unique fingerprints. These fingerprints may be referred to as expected future fingerprints. The expected future fingerprints may be identified and selected in various ways.

In some embodiments, the expected future fingerprints may be identified and selected by returning, from the dedupe server, additional fingerprints from containers where deduped fingerprints were previously determined by the dedupe server to exist. In other embodiments, the expected future fingerprints may be identified and selected by returning fingerprints that are in the next container object, or the next 'n' container objects (where 'n' may be any integer ≥1) of the container where the deduped fingerprints were detected. In still other embodiments, an AI/ML (Artificial Intelligence/Machine Learning) based model may be used to detect what other fingerprints can match in the future and send back those fingerprints. Any of the aforementioned identification and selection processes may be performed using data structures, such as the fingerprint indices for example, without requiring the use of any additional IOs between the client and the dedupe system.

The number of existing fingerprints to be sent back from the dedupe server to the client can be determined in various ways. For example, and as noted earlier, the client may specify a value for the variable future ref threshold. Thus, for example, if future ref threshold is set by the client as '1000,' it would mean that the dedupe system should send back 1000 additional existing fingerprints to the client. As another example, the dedupe system may simply return any and all fingerprints found by the dedupe server to be existing. For example, if the client sends 1000 fingerprints 202 and dedupe system finds 400 of those fingerprints to be unique, the dedupe system will send back the 400 unique fingerprints, as well as 600 existing fingerprints to be used by the client to identify possible future matches. Yet another approach to determining the number of existing, that is, non-unique, fingerprints to be sent back to the client may be based on an adaptive match rate. That is, if the match rate in the client was high last time, then increase the number of fingerprints being sent back. The client can send back the match rate every time to the dedupe system. To illustrate, if the dedupe system sent 500 additional fingerprints in the first call and the match rate was more than 50%, then the dedupe system may send 1000 additional fingerprints in the next call and so on. On the other hand, if the match percent was lower, such as about 25% for example, then the dedupe system can use the match rate information received from the client to reduce the number of existing fingerprints to send to the client, such as to about 300-400 additional fingerprints for example. Note that as used herein, 'match rate' refers to the rate at which existing fingerprints returned 208 from the dedupe server to the client match fingerprints already at the client. So if the dedupe system sends 1000 existing fingerprints to the client, and 500 of those fingerprints match fingerprints already at the client, the match rate in this example would be 50%.

After the number of existing fingerprints to be sent to the client has been determined, then the set of additional existing fingerprints selected may be piggybacked in the response 208, of the same RPC call, which would also be carrying the set of unique non-existing fingerprints. The client may then receive 210 all the fingerprints, that is, the set of unique fingerprints and the set of non-unique fingerprints sent 208 by the dedupe server.

After receipt 210 of the unique, and non-unique, fingerprints from the dedupe server, the client may then copy all of the existing, or non-unique, fingerprints received from the server to an in-memory list that may be locally maintained at the client. The in-memory list may have sufficient capacity to hold the fingerprints returned in response to multiple RPCs. To illustrate, assuming a fingerprint to be 40 bytes, 10 million could be stored in about 380 MB of memory, or storage. In some embodiments, the client may define a maximum number of fingerprints to be stored locally at the client in the in-memory list.

In some embodiments, the client may hold the set of existing fingerprints for a period of time, since it may be the case that the client does not receive all the backup data at once. By retaining the existing fingerprints in this way, the client may have a fuller, or complete, set of fingerprints. That is, the client may receive some amount of fingerprints on each of a number of occasions, process the fingerprints by attempting to match the fingerprints with the set of in-memory fingerprints, and then request and receive another set of fingerprints. This approach may help to ensure that the client has enough fingerprints stored locally to enable a matching process in which fingerprints received from the dedupe server are compared with locally stored fingerprints.

In the example case where one or more embodiments are extended to dedupe operations such as file replication for example, where all the fingerprints may be available to the client, such embodiments may be optimized further to match all, or a configurable number, of the additional fingerprints received directly.

With continued reference to the example of FIG. 2, the client may send 212, to the dedupe server, only the unique data segments, that is, the data segments whose corresponding fingerprints are in the unique list at the dedupe server. The dedupe server may write 214 these unique data segments to disk, and add the fingerprints which correspond to the unique data segments, to one or more indexes and/or databases at the storage site.

The remaining fingerprints which were found to be existing by the dedupe server may be deduped to the existing data segments in the dedupe system. Because those fingerprints already exist, there is no need for the client to send the corresponding data segments to the dedupe server. In this way, the number of segments sent to the dedupe server, and the number of RPCs sent by the client, may be reduced. Moreover, because the server may have sent additional existing fingerprints to the client, possibly at the suggestion of the client, the client may be proactively advised that there is no need to send the corresponding data segments to the dedupe server. Absent this functionality, the client might have sent non-unique data segments to the dedupe server, only to find out later from the dedupe server that fingerprints for those non-unique data segments already exist and the client need not have sent those non-unique data segments to the dedupe server in the first place.

Turning once more to the example of FIG. 2, the client may receive a next chunk of data, such as data from a backup dataset for example, and then segment the data and create the fingerprints that correspond to the segmented data chunks. However, before sending those fingerprints, the client may perform a filtering process 216 to check whether any of the new fingerprints are already present in the local in-memory list, where the local in-memory list may include the additional non-unique fingerprints previously sent back to the client by the dedupe system. If any of the newly created fingerprints are found in the in-mem list, then that fingerprint and its associated data segment would not be sent to the dedupe system 218.

Because of the locality principle, there may be a relatively high probability that many of the newly created fingerprints would be found in the in-memory list, which may include extra fingerprints received from the dedupe server based on the locality of those extra fingerprints, and thus the newly created fingerprints would not have to be sent to the dedupe system for processing. Likewise, the data segments that were used as the basis for those newly created fingerprints were generated would not have to be sent to the dedupe system, since those fingerprints are already in the in-memory list. Instead, those data segments may be simply deduped.

The segment tree or metadata mappings of these fingerprints, such as offset and length for example, and/or any other meta required to build the metadata for the file in the dedupe system may be sent 220 by the client to the dedupe system. Depending upon the embodiment, the segment tree and/or data mappings of the fingerprints may be sent 220 only once, such as at the end of a data ingest process at the dedupe server, or may be sent 220 periodically on multiple occasions as necessary to suit requirements of the dedupe system. With the information sent 220 to it by the client, the dedupe server may then build 222 the file metadata at the data storage site.

Embodiments of the invention, including the example method 200 disclosed in FIG. 2, may reduce the overall number of fingerprints sent to the dedupe system, thereby reducing the total number of RPC/network calls needed for the processing of data, such as a backup dataset for example. And because example embodiments of the dedupe system may thus receive relatively fewer fingerprints to search, the processing load on the dedupe server may thereby be reduce, since the dedupe system would otherwise had to have checked various indices or dictionaries at the storage site for the existence of the numerous fingerprints.

E. Additional Considerations

It is noted that while the example method of FIG. 2 is described in terms of client libraries and dedupe systems, that method may be applied to a wide variety of dedupe algorithms such as, for example, dedupe algorithms that involve one or more of data movement to a cloud tier, data recalls from cloud tiers, and replication of data to destination systems, or any other dedupe algorithm where the similar segment reference based existence checks are performed before data is sent from one or more clients to a dedupe system.

As well, embodiments may be applied in various use cases. One or more of such use cases may or may not be DD use cases. Examples of use cases in which embodiments of the invention may be applied include, but are not limited to: regular DDBoost protocol for incremental backups which are taken as full, such as for VM backups where multiple clients are using the same VM; during a replication re-sync operation, if there are no common snapshots between source and destination, the re-initialization of the whole data set needs to be done and this may take significant time and network bandwidth—in this case, embodiments of the invention may reduce the time and amount of data needed for resynchronization by identifying common data that is shared by the snapshots and which does not need to be sent to the destination for deduplication; in file replication processes where multiple generations of the backups are replicated—a managed file replication process may use the DDBoost protocol and send segments and receipt of fingerprints are done there, wherein receipt of fingerprints may be performed using a 'recv' function receives data from a connected socket or a bound connectionless socket; during data-movement to a cloud storage site, particularly where large files are being moved; and, when files already moved to cloud storage are recalled back to local on-premises site.

As set forth in the disclosure, example embodiments of the invention may, but are not required to, possess various features and functionalities. Following are some non-limiting examples of such features and functionalities, any group of one or more of which may be included/implemented in any embodiment. For example, some embodiments embrace a method that may optimize dedupe algorithms that use Distributed Segment Processing (DSP). For example, wherever large files are moved/replicated and have a high dedupe factor, such embodiments may further optimize the copy bandwidth, and improve network utilization, while freeing up the dedupe system to a great extent to do other work. As another example, in DSP scenarios at least, some example embodiments may greatly reduce, relative to circumstances where example embodiments are not employed, the total number of fingerprints being sent to the dedupe system for existence check. This reduction of the number of fingerprints being sent may, in turn, reduce the amount of processing required in the dedupe systems during backup operations, relative to the processing that would be required where the number of fingerprints being sent is not reduced. As another example, some embodiments may piggy-back the set of additional existing fingerprints back to the client in the response of the same RPC/Network call, thus obviating the need for any new calls for those existing fingerprints. In a further example, the window and size of fingerprints sent back to the client may increase/decrease the optimization accordingly, and the window and size parameters may be configurable by the client or the dedupe system. Finally, example embodiments are directed to a method that may also be extended to various other algorithms of the dedupe system like data movement to cloud tier, recalls from cloud tiers, replication to destination systems, where the similar fingerprint based existence checks are done before sending data. Example embodiments may optimize Distributed Segment Processing mechanisms in dedupe systems and client libraries by reducing the amount of fingerprints sent to the dedupe system for existence check during ingests, replication, data movement to cloud, and other data management processes. Finally, and as noted, embodiments of the invention may be applied to the EMC DataDomain platform. Such application may be useful as DDBoost is widely used by numerous customer backup applications to back up their data in a performance oriented manner. Embodiments of the invention may optimize the DDBoost protocol DSP mechanism, and thereby provide a positive impact for customers who use that mechanism.

F. Further Example Embodiments

Following are some further example embodiments of the invention. These are presented only by way of example and are not intended to limit the scope of the invention in any way.

Embodiment 1. A method, comprising: receiving at a dedupe system, from a client, a request that comprises a set of fingerprints, where each fingerprint in the set corresponds to a particular data segment; filtering, at the dedupe system, the set of fingerprints into a set of unique fingerprints and a set of non-unique fingerprints; reading, at the dedupe system, from a container where copies of the non-unique fingerprints are stored, an additional set of non-unique fingerprints; sending, from the dedupe system to the client, a single response that comprises both the set of unique fingerprints and the additional set of non-unique fingerprints; and receiving from the client, at the dedupe system, data segments that respectively correspond to the unique fingerprints in the set of unique fingerprints, but no data segments corresponding to the non-unique fingerprints in the set of non-unique fingerprints are received by the dedupe system from the client.

Embodiment 2. The method as recited in embodiment 1, wherein all of the fingerprints in the response are sent in response to a single request from the client.

Embodiment 3. The method as recited in any of embodiments 1-2, wherein a number of fingerprints in the additional set of non-unique fingerprints is specified in the request.

Embodiment 4. The method as recited in any of embodiments 1-3, wherein some of the non-unique fingerprints in the additional set of non-unique fingerprints match fingerprints stored at the client.

Embodiment 5. The method as recited in any of embodiments 1-4, wherein the fingerprints in the request from the client do not include any fingerprints that were in storage at the client at the time the request was sent.

Embodiment 6. The method as recited in any of embodiments 1-5, further comprising writing, by the dedupe system, the data segments that respectively correspond to the unique fingerprints, and adding, by the dedupe system, the unique fingerprints to an index or database of the dedupe system.

Embodiment 7. The method as recited in any of embodiments 1-6, wherein filtering comprises comparing the fingerprints contained in the request against a fingerprint filter.

Embodiment 8. The method as recited in any of embodiments 1-7, wherein the fingerprints in the additional set of non-unique fingerprints are selected based on a likelihood that those fingerprints would be requested in a future request by the client.

Embodiment 9. The method as recited in any of embodiments 1-8, wherein the fingerprints in the additional set of non-unique fingerprints do not necessitate an additional request from the client.

Embodiment 10. The method as recited in any of embodiments 1-9, further comprising receiving, by the dedupe system from the client, a segment tree or metadata mapping associated with the data segments that respectively correspond to the unique fingerprints.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
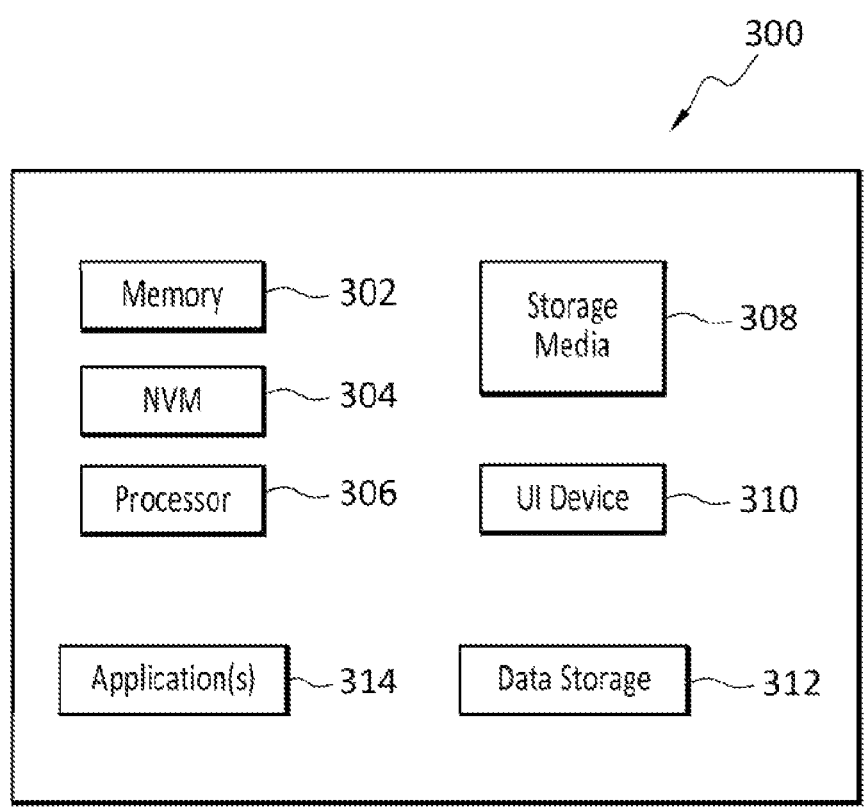
FIG. 3 discloses a computing entity configured to perform any of the disclosed methods and processes.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   sending, by a client to a dedupe system, a set of fingerprints for filtering by the dedupe system;
   receiving, by the client from the dedupe system, fingerprints of the set of fingerprints that were identified by the dedupe system as unique fingerprints, and additional non-unique fingerprints from a set of containers of the dedupe system;
   sending, by the client to the dedupe system, only unique segments for writing by the dedupe system, and the unique segments form a set;
   receiving, by the client system, data from a backup dataset, and segmenting and fingerprinting the data from the backup dataset to create a next set of fingerprints;
   filtering, by the client system, fingerprints in the next set of fingerprints, using additional existing fingerprints received earlier from the dedupe system, so as to identify unique segments of the next set; and
   sending, by the client system to the dedupe system, a segment tree of the unique segments of the next set.

2. The method as recited in claim 1, wherein any fingerprints identified, during the filtering, as matching fingerprints already present in a local in-memory list, are not sent by the client system to the dedupe system.

3. The method as recited in claim 2, wherein the local in-memory list includes one or more non-unique fingerprints previously sent by the client system to the dedupe system.

4. The method as recited in claim 1, wherein the segment tree is usable by the dedupe system to build file metadata for a file.

5. The method as recited in claim 1, wherein an amount of the unique fingerprints sent by the dedupe system to the client is specified by the client.

6. The method as recited in claim 1, wherein an amount of the unique fingerprints sent by the dedupe system to the client is a function of a value of an adaptive match rate that is determined by the client.

7. The method as recited in claim 1, wherein the unique fingerprints, and the additional non-unique fingerprints from the set of containers of the dedupe system, are both received by the client in response to a single RPC (remote procedure call) issued by the client to the dedupe system.

8. The method as recited in claim 1, the unique fingerprints, and the additional non-unique fingerprints received by the client from the dedupe system, are written by the client to an in-memory list locally maintained at the client.

9. The method as recited in claim 1, wherein the segment tree is sent at an end of a data ingest process at the dedupe system.

10. The method as recited in claim 1, wherein the unique segments are created by the client.

11. A non-transitory storage medium having stored therein instructions that are executable by one or more hardware processors to perform operations comprising:
    sending, by a client to a dedupe system, a set of fingerprints for filtering by the dedupe system;
    receiving, by the client from the dedupe system, fingerprints of the set of fingerprints that were identified by the dedupe system as unique fingerprints, and additional non-unique fingerprints from a set of containers of the dedupe system;
    sending, by the client to the dedupe system, only unique segments for writing by the dedupe system, and the unique segments form a set;
    receiving, by the client system, data from a backup dataset, and segmenting and fingerprinting the data from the backup dataset to create a next set of fingerprints;
    filtering, by the client system, fingerprints in the next set of fingerprints, using additional existing fingerprints received earlier from the dedupe system, so as to identify unique segments of the next set; and
    sending, by the client system to the dedupe system, a segment tree of the unique segments of the next set.

12. The non-transitory storage medium as recited in claim 11, wherein any fingerprints identified, during the filtering, as matching fingerprints already present in a local in-memory list, are not sent by the client system to the dedupe system.

13. The non-transitory storage medium as recited in claim 2, wherein the local in-memory list includes one or more non-unique fingerprints previously sent by the client system to the dedupe system.

14. The non-transitory storage medium as recited in claim 11, wherein the segment tree is usable by the dedupe system to build file metadata for a file.

15. The non-transitory storage medium as recited in claim 11, wherein an amount of the unique fingerprints sent by the dedupe system to the client is specified by the client.

16. The non-transitory storage medium as recited in claim 11, wherein an amount of the unique fingerprints sent by the dedupe system to the client is a function of a value of an adaptive match rate that is determined by the client.

17. The non-transitory storage medium as recited in claim 11, wherein the unique fingerprints, and the additional non-unique fingerprints from the set of containers of the dedupe system, are both received by the client in response to a single RPC (remote procedure call) issued by the client to the dedupe system.

18. The non-transitory storage medium as recited in claim 11, the unique fingerprints, and the additional non-unique fingerprints received by the client from the dedupe system, are written by the client to an in-memory list locally maintained at the client.

19. The non-transitory storage medium as recited in claim 11, wherein the segment tree is sent at an end of a data ingest process at the dedupe system.

20. The non-transitory storage medium as recited in claim 11, wherein the unique segments are created by the client.

* * * * *